(12) United States Patent
Kennedy (10) Patent No.: US 9,135,442 B1
(45) Date of Patent: Sep. 15, 2015

(54) METHODS AND SYSTEMS FOR DETECTING OBFUSCATED EXECUTABLES

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1642 days.

(21) Appl. No.: 12/130,827

(22) Filed: May 30, 2008

(51) Int. Cl.
*G06F 9/44* (2006.01)
*G06F 21/56* (2013.01)
*G06F 9/445* (2006.01)

(52) U.S. Cl.
CPC .......... *G06F 21/563* (2013.01); *G06F 9/44589* (2013.01)

(58) Field of Classification Search
None
See application file for complete search history.

(56) References Cited

U.S. PATENT DOCUMENTS

| 6,418,444 | B1* | 7/2002 | Raduchel et al. | 717/126 |
| 6,487,522 | B1* | 11/2002 | Smith et al. | 702/186 |
| 2005/0223238 | A1* | 10/2005 | Schmid et al. | 713/188 |
| 2007/0245419 | A1* | 10/2007 | Omahony | 726/23 |

OTHER PUBLICATIONS

Aaraj, et al. "Energy and Execution Time Analysis of a Software-based Trusted Platform Module", 2007, EDAA, p. 1128-1133.*

* cited by examiner

*Primary Examiner* — Qamrun Nahar
(74) *Attorney, Agent, or Firm* — ALG Intellectual Property, LLC (57) ABSTRACT

A computer-implemented method for detecting an obfuscated executable may include identifying an executable file programmed to execute on a target architecture. The method may also include disassembling a first section of the executable file and determining whether the first section of the executable file comprises a valid instruction. The method may further include determining, based on whether the first section of the executable file comprises a valid instruction, whether the executable file poses a security risk. Various other methods, computer-readable media, and systems are also disclosed.

20 Claims, 7 Drawing Sheets

METHODS AND SYSTEMS FOR DETECTING OBFUSCATED EXECUTABLES

BACKGROUND

Consumers and businesses increasingly rely on computers to store sensitive data. Consequently, malicious programmers seem to continually increase their efforts gain illegitimate control and access to others' computers. Computer programmers with malicious motivations have created and continue to create viruses, Trojan horses, worms, and other programs meant to compromise computer systems and data belonging to other people. These malicious programs are often referred to as malware.

Malware authors may seek to obfuscate their executables in order to evade detection. Malware authors may use binary run-time packers to obfuscate their executables. Since binary run-time packers typically compress, security software may be able to detect them by checking entropy. For example, anti-virus software may detect such malware by determining whether the executables have high entropy.

In an effort to circumvent entropy checks, some malware authors use obfuscators that may act like polymorphic encryptors and do not significantly change the entropy. Malware authors may maintain the entropy of their executables by including sections of random patterns in their executables. Traditional security software may be unable to detect malware that is obfuscated in this manner. What is needed, therefore, is a better way to detect obfuscated executables, particularly when the obfuscated executables are not detectable using an entropy check.

SUMMARY

According to certain embodiments, a method for detecting an obfuscated executable may comprise identifying an executable file programmed to execute on a target architecture. The target architecture may be a central processing unit (CPU) architecture such as the INTEL x86 architecture. A security module may disassemble a first section of the executable file and determine whether the first section of the executable file comprises a valid instruction for the target architecture. The security module may then determine whether the executable file poses a security risk (e.g., contains malware). The determination of whether the executable file poses a security risk may be based on whether the first section of the executable file comprises a valid instruction. For example, if the first section of code does not comprise a valid instruction, the security module may determine that the executable file is obfuscated and poses a security risk.

In some embodiments, the security module may evaluate numerous sections of the executable file to determine whether the executable file poses a security risk. For example, the security module may find a number of valid instructions and a number of invalid instructions. The security module may determine that the executable file comprises a security risk if a ratio of invalid instructions to total instructions exceeds a predetermined threshold.

The security module may determine that the first section of the executable file comprises a valid instruction. However, a determination that the first section of code comprises a valid instruction may not be dispositive of whether the first section of code is code that was randomly generated by an obfuscator. For example, randomly generated code may disassemble into valid instructions, but the disassembled instructions may not make sense.

The security module may check valid instructions to determine whether they are illogical. Illogical instructions may be obscure instructions, instructions that are repeated numerous times, instructions that operate on unexpected memory locations, and/or other types of instructions that do not make sense. The determination of whether the executable file poses a security risk may be based on whether the first section of the executable file comprises an illogical instruction.

As previously noted, the security module may evaluate numerous sections of the executable file to determine whether the executable file poses a security risk. The security module may find a number of logical instructions and a number of illogical instructions. The security module may determine that the executable file comprises a security risk if a ratio of illogical instructions to total instructions exceeds a predetermined threshold. In some embodiments, the security module may take both illogical and invalid instructions into account when determining whether the executable file comprises a security risk.

According to various embodiments, disassembling the first section of the executable file may comprise selecting a first starting point for disassembling. The security module may then disassemble the first section of the executable file from the first starting point. The security module may also disassemble a plurality of additional sections of the executable file. The plurality of sections may be consecutive sections, and each section in the plurality of sections may be offset from a previous section by one byte.

In some embodiments, a maximum-length instruction of the target architecture may comprise a number of bytes (e.g., a maximum-length instruction of the x86 architecture comprises 16 bytes). The number of sections in the plurality of sections may be at least equal to the number of bytes in the maximum-length instruction. In other words, the security module begin disassembling the file at a specified offset: location "x". The security module may then attempt to disassemble the code at each offset from "x plus 1 byte" through "x plus y bytes", where y is the number of bytes in the longest instruction in the target architecture.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure is directed to detecting obfuscated executables. In some embodiments, a security module may disassemble an executable file to determine whether the executable file comprises valid and/or logical instructions. If the executable file includes invalid and/or illogical instructions, the security module may determine that the executable file is obfuscated and poses a security risk. The methods and systems disclosed herein may provide security software that is capable of determining whether executable files comprise a security risk. As discussed in greater detail below, the methods and systems disclosed herein may provide various other features and advantages.

Figure 1:
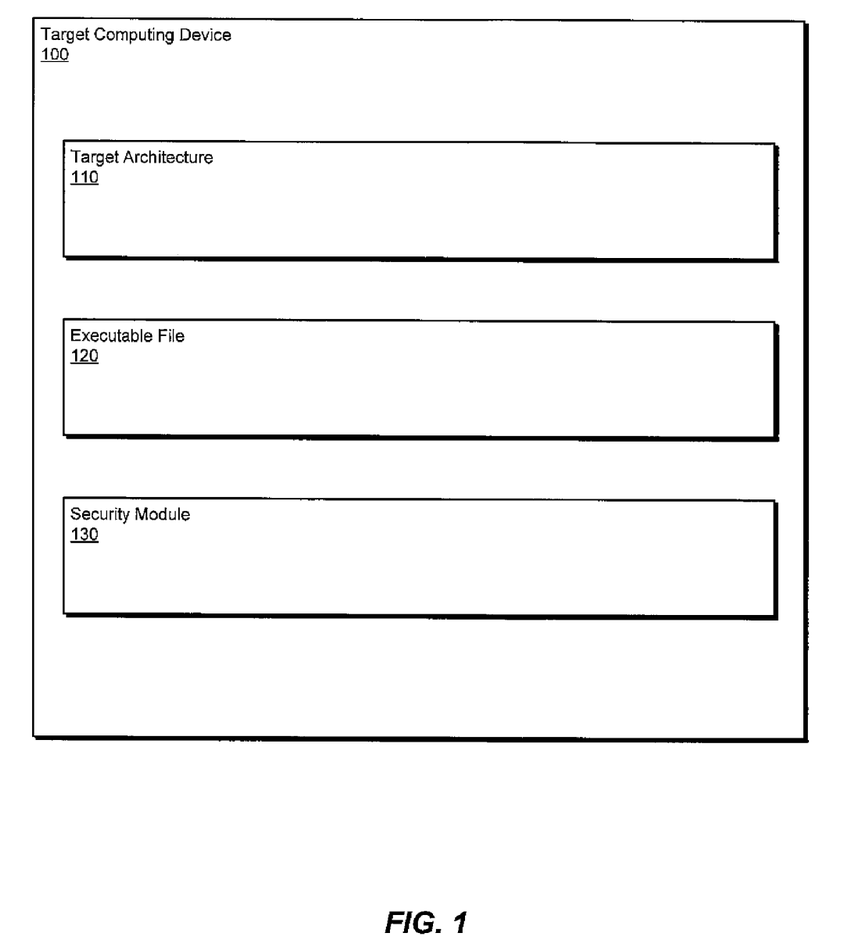
FIG. 1 is a block diagram of an exemplary computing device according to certain embodiments.
Figure 2:
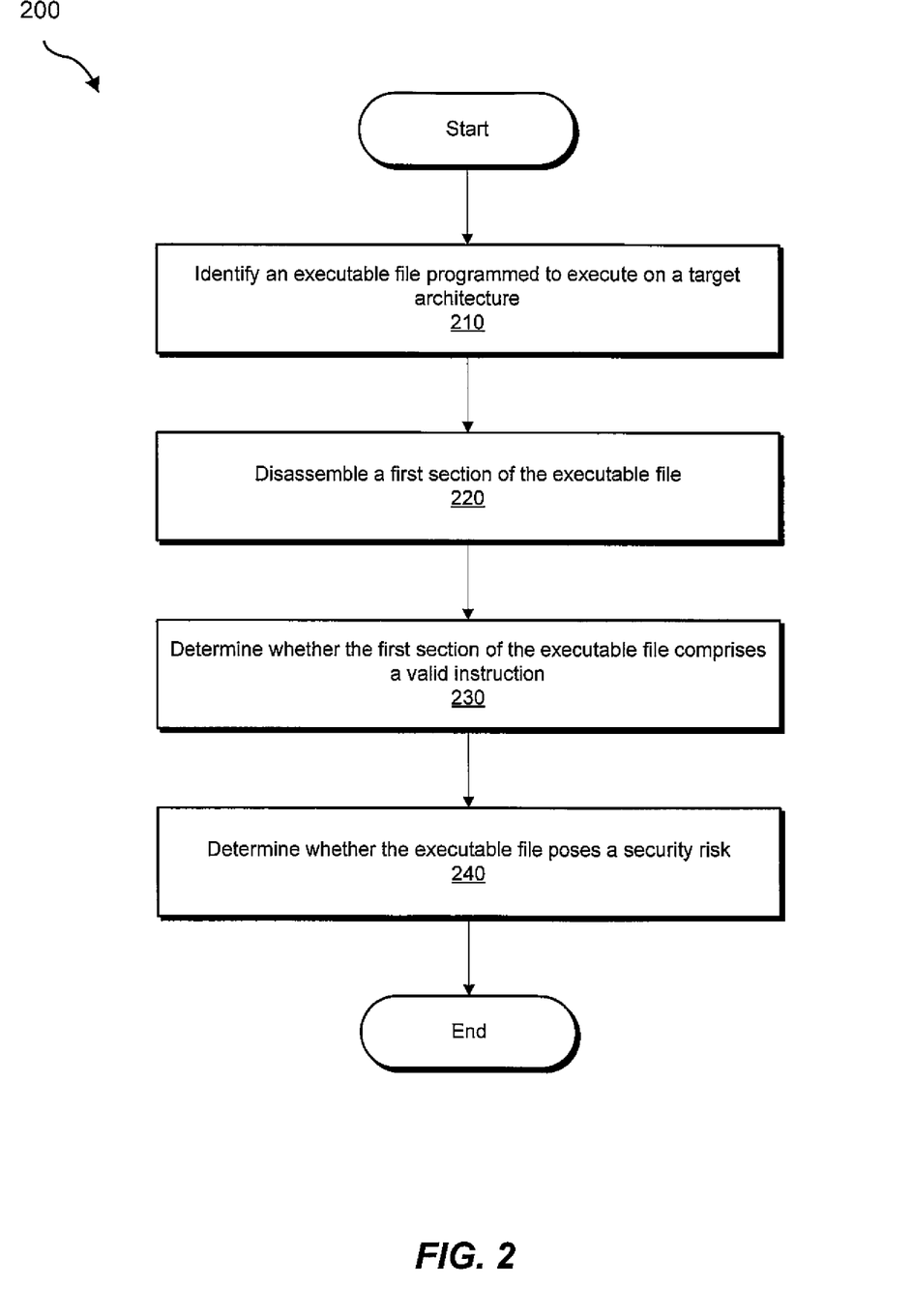
FIG. 2 is a flow diagram of an exemplary method for detecting obfuscated executables according to certain embodiments.
Figure 3:
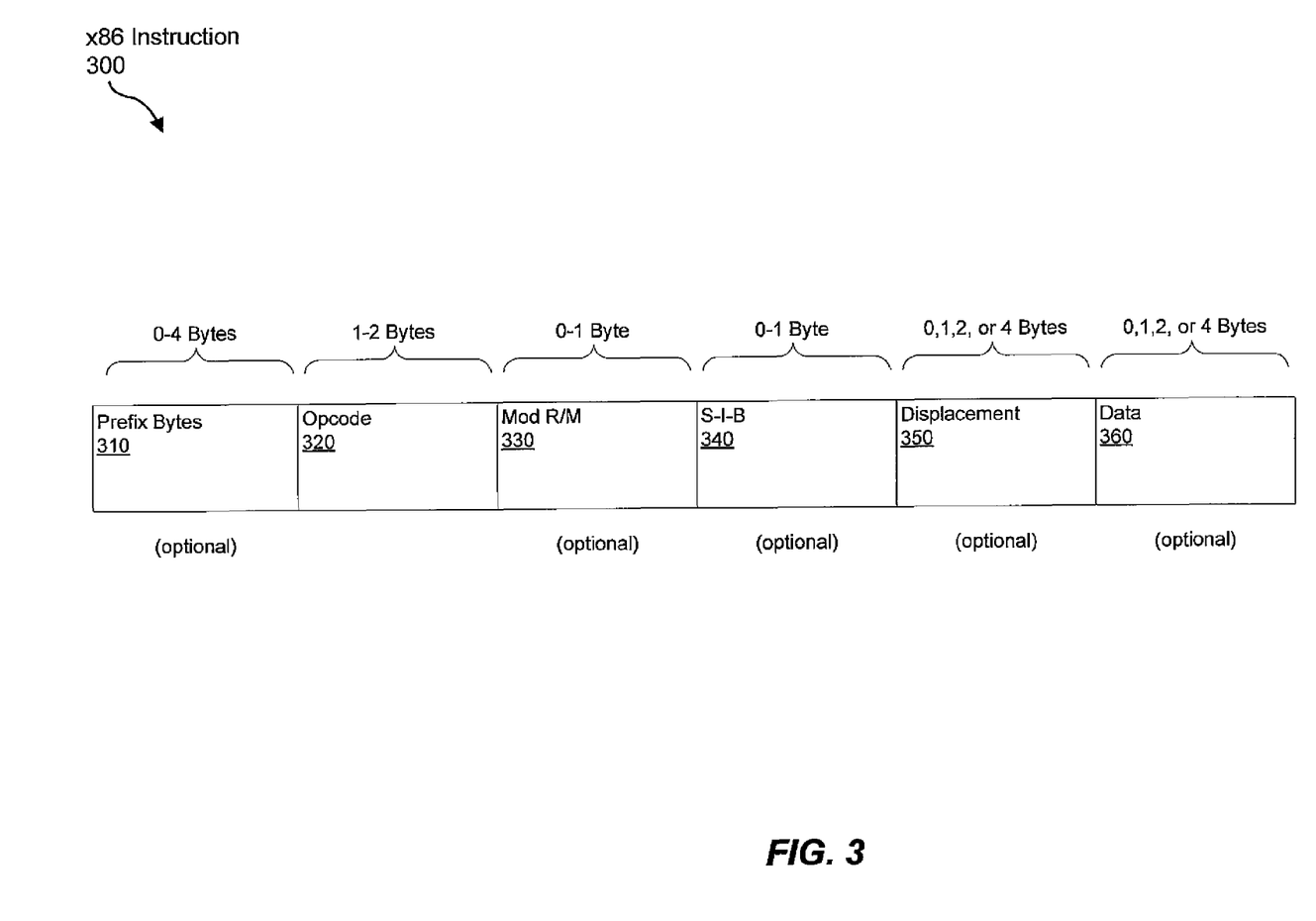
FIG. 3 is a block diagram of an instruction format of an x86 instruction according to certain embodiments.
Figure 4:
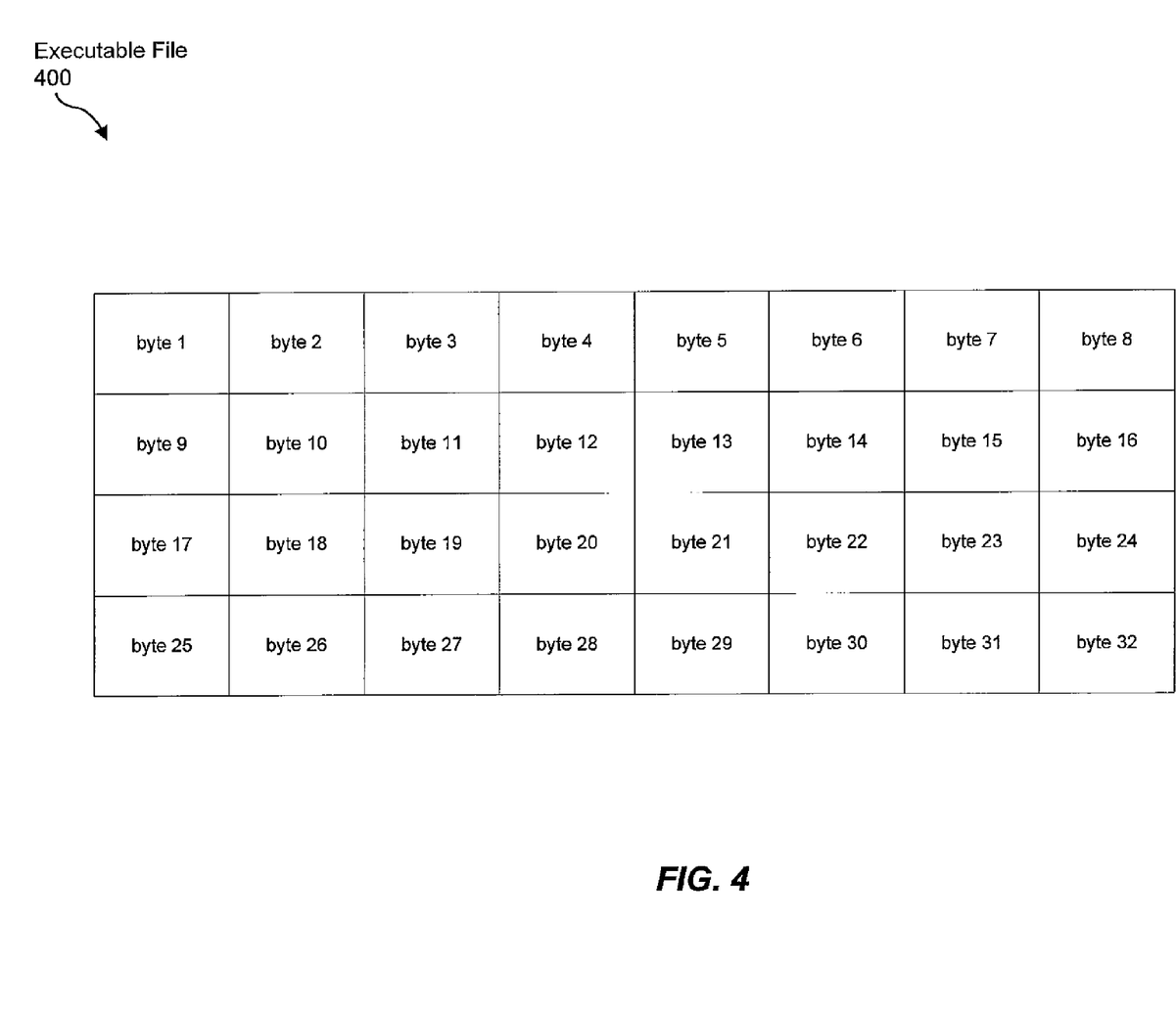
FIG. 4 is a block diagram of bytes within an exemplary executable file according to certain embodiments.
Figure 5:
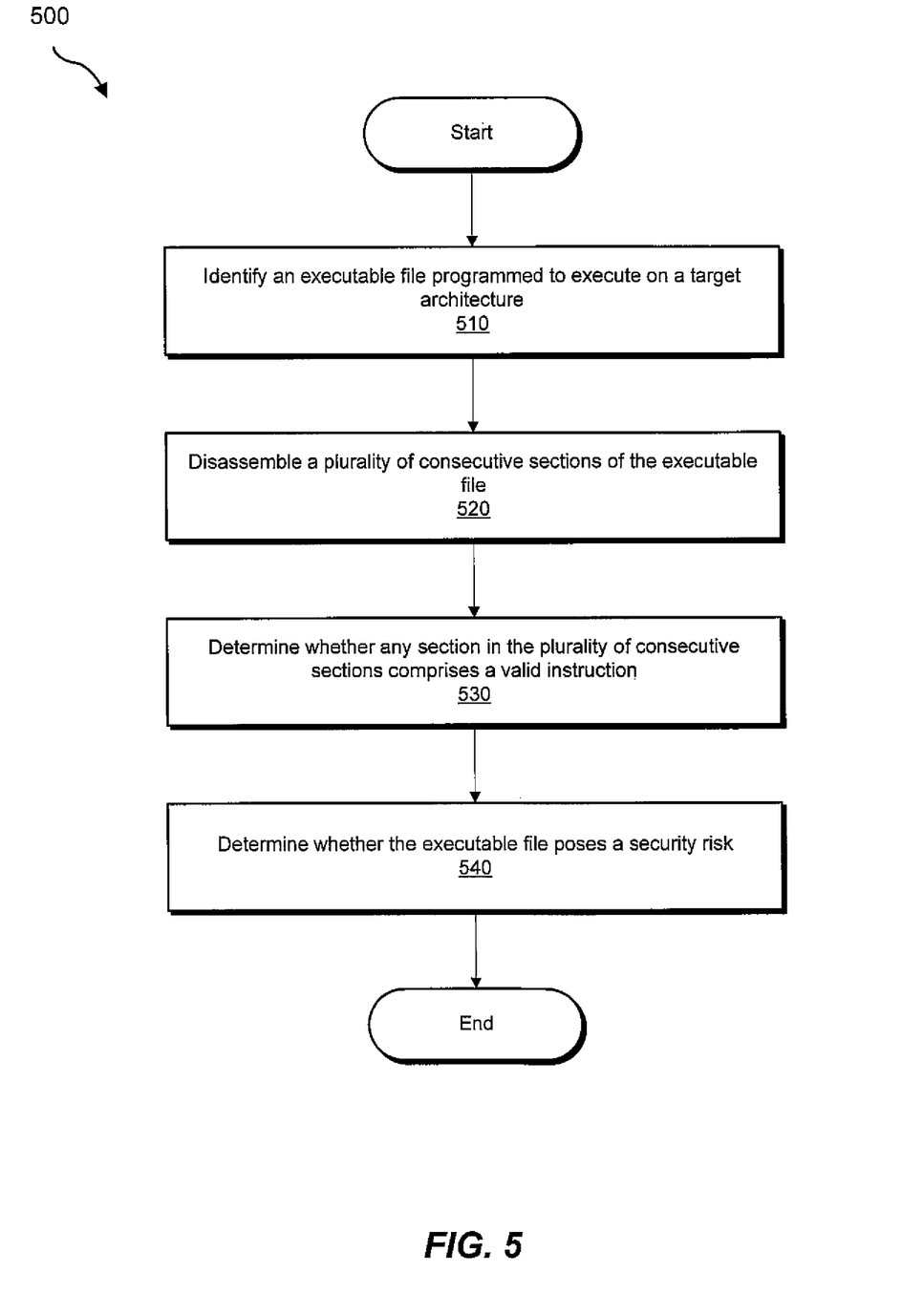
FIG. 5 is a flow diagram of an exemplary method for detecting an obfuscated executable.

In the following disclosure, FIG. 1 illustrates an exemplary target computing device and FIG. 2 illustrates an exemplary method for detecting obfuscated executables. FIG. 3 shows an exemplary x86 instruction, and FIG. 4 shows an exemplary executable file. FIG. 5 illustrates another method for detecting obfuscated executables.

FIG. 1 illustrates a target computing device 100 that includes a target architecture 110, an executable file 120, and a security module 130. Target computing device 100 may be a personal computer, a laptop, a server, or any other suitable computing device. Executable file 120 may be any set of computer-readable instructions programmed to execute on target architecture 110.

Target architecture 110 may be any computer architecture capable of executing code. The phrase "computer architecture" may refer to the conceptual design and operational structure of a computing device. Computer architecture may encompass the requirements and design implementation for various parts of a computer and may define how a central processing unit performs internally and accesses addresses in memory. For example, a computer's architecture may define the instruction set, memory address modes, processor registers, address formats, and data formats of a computer's central processing unit.

Security module 130 may be installed on target computing device 100 and may provide protection for computing device 100. Security module 130 may be an anti-malware program, such as an anti-virus program. Security module 130 may also be any other module or application programmed to determine whether an executable file poses a security risk. Security module 130 may be programmed to perform the steps shown in FIG. 2.

Security module 130 may identify executable file 120 (step 210). Security module 130 may identify executable file 120 while scanning target computing device 100 for potential security risks. In other embodiments, security module 130 may identify executable file 120 when executable file 120 is downloaded or otherwise loaded onto target computing device 100. Security module 130 may also identify executable file 120 by detecting locations within an image where executable code resides. Security module 130 may then pick an disassembly starting point in the image in a location that comprises executable code.

After identifying executable file 120, security module 130 may disassemble a first section of executable file 120 (step 220). Disassembling may refer to an operation that is the inverse assembling of computer code. For example, security module 130 may disassemble the first section of executable file 120 by translating machine language from executable file 120 into assembly language. Machine language, which may also be referred to as machine code, may refer to instructions and data directly executed by a computer's central processing unit. Assembly code may refer to low-level code that is programmed with a symbolic representation of numeric machine codes for a particular CPU architecture.

In some embodiments, the size of the first section may be a predetermined size in bits, bytes, or any other data-length metric. For example, the first section of the executable file may be a length of a minimum-length instruction of target architecture 110. A minimum-length instruction may be an instruction with a length of the shortest valid instruction of target architecture 110. In other embodiments, the first section of executable file 120 may be a length of a maximum-length instruction of target architecture 110. A maximum-length instruction may be an instruction with a length of the longest valid instruction of target architecture 110. The first section may also be long enough to include numerous instructions. In other embodiments, security module 130 may disassemble sections of variable length. Thus, the first section may have a variable length. For example, security module 130 may disassemble a first section of executable file 120 until security module 130 has disassembled a predetermined number of instructions.

Security module 130, after disassembling the first section of executable file 120, may determine whether the first section of executable file 120 comprises a valid instruction (step 230). A valid instruction may be any instruction formatted in a manner recognized by target architecture 110. For example, a valid instruction may be an instruction that contains each component necessary to execute on target architecture 110. In some embodiments, determining whether the first section of executable file 120 comprises a valid instruction may be one step in an analysis of whether the first section of executable file 120 comprises multiple valid instructions.

Security module 130 may determine whether the executable file poses a security risk based on whether the first section of executable file 120 comprises a valid instruction (step 240). In some embodiments, determining whether the first section of executable file 120 comprises a valid instruction may be one of many steps involved in determining whether executable file 120 poses a security risk. For example, security module 130 may look for valid instructions in numerous sections of code before determining whether executable file 120 poses a security risk.

Security module 130 may disassemble a large portion of code from executable file 120 and compute a ratio of valid instructions to a total length of the portion code. If a predetermined percentage of the code does not comprise valid instructions, security module 130 may deem executable file 120 to be a security risk (e.g., security module 130 may determine that executable file 120 comprises malware). For example, if more than 2 out of 10 instructions are invalid, security module 130 may determine that executable file 120 poses a security risk. In other embodiments, security module 130 may look for a predetermined number of invalid instructions in a fixed amount of code from executable file 120. If the number of invalid instructions exceeds the predetermined threshold, security module 130 may determine that executable file 120 comprises a security risk. Security module 130 may use various other algorithms and heuristics to determine whether executable file 120 comprises a security risk.

Security module 130 may need to examine several sections of code other than the first section to determine whether a valid instruction is present in the portion of code under examination. For example, the location chosen to start disassembling the executable file may not be at the beginning of an instruction. Thus, in some embodiments, security module 130 may disassemble the executable file from starting locations that are offset from the initial starting location until security module 130 finds the beginning of an instruction. Security module 130 may need to iterate through enough starting locations to cover a maximum-length instruction of target architecture 110 to be sure that a valid instruction, if one exists in the examined section of code, would be found.

In some embodiments, a maximum-length instruction of target architecture 110 may comprise a number of bytes (e.g., a maximum-length instruction of the x86 architecture comprises 16 bytes). The number of consecutive sections examined by security module 130 may be at least equal to the number of bytes in the maximum-length instruction. The security module may begin disassembling the file at a specified location: location "x". The security module may then attempt to disassemble the code at each offset from x plus 1 byte through x plus y bytes, where y is the number of bytes in the longest instruction in the target architecture.

In other words, security module 130 may disassemble a plurality of sections that are offset from a previous sections by one byte. Security module 130 may disassemble the first section of executable file 120 by selecting a starting point for disassembling. Security module 130 may then choose a second disassembly starting point that is one byte after the first starting point. Next, security module 130 may choose a third starting point that is one byte after the second starting point. Security module 130 may continue this process of selecting new starting points that are one byte after a previous starting point until the number of starting points is at least equal to the number of bytes in a maximum-length instruction of the target architecture. In alternative embodiments, security module 130 may choose offsets that are before a previous starting point by one or more bytes. Thus, security module 130 may work backward, rather than forward, in searching for the beginning of an instruction.

Security module 130 may also determine whether the first section and other sections of the executable file comprise an illogical instruction. An illogical instruction may be any instruction that does not make sense. For example, an illogical instruction may be an instruction that does not make sense in the context of the executable file that contains the illogical instruction. As one example, an illogical instruction may be an instruction found in a set of code that comprises the same instruction over and over, such as the instruction sequence: mov x,y; mov x,y; mov x,y. This exemplary instruction sequence is an example of an attempt to redundantly load memory at address x with the data located at address y. In general, the instruction mov x,y may not be illogical. However, an instruction that is repeated numerous times may be an indication of attempt to obfuscate an executable.

Security module 130 may base the determination of whether executable file 120 is obfuscated on whether executable file 120 comprises one or more obscure instructions. An obscure instruction may be an instruction that is rarely used, such as the x86 opcode 0x9E (hexadecimal), which corresponds to the instruction SAHF. An obscure instruction may also be an instruction that attempts to access an unexpected memory location. An unexpected memory location may be a memory location that is out of the range of data that the executable program would typically access. An unexpected memory location may also be a memory location that does not exist. Security module 130 may determine whether executable file 120 comprises a number of consecutive obscure instructions in determining whether executable file 120 is obfuscated.

Security module 130 may disassemble a large portion of code from executable file 120 and compute a ratio of illogical instructions to a total length of the portion of code. If a predetermined percentage of the code does not comprise logical instructions (i.e., instructions that are not illogical), security module 130 may deem executable file 120 to be a security risk. For example, if more than 2 out of 10 instructions are illogical, security module 130 may determine that executable file 120 comprises a security risk. In other embodiments, security module 130 may look for a predetermined number of illogical instructions in a fixed amount of code from executable file 120. If the number of illogical instructions in the fixed amount of code exceeds the predetermined threshold, security module 130 may determine that executable file 120 comprises a security risk.

In some embodiments, security module 130 may look at both whether the executable file contains invalid instructions and whether the executable file contains illogical instructions in determining whether the executable file is obfuscated. In other words, security module 130 may determine whether executable file 120 poses a security risk by taking both invalid and illogical instructions into consideration. Security module 130 may determine whether the number of invalid and illogical instructions exceeds a predetermined threshold. If the total number of invalid and illogical instructions exceeds the predetermined threshold, security module 130 may determine that executable file 120 poses a security risk. Security module 130 may also use a variety of other heuristics and/or algorithms in looking at invalid and illogical instructions to determine whether executable file 120 poses a security risk.

FIG. 3 shows an exemplary x86 instruction 300. As shown, x86 instructions may comprise instruction prefixes 310, one or two primary opcode bytes 320, Mod RIM bytes 330, a Skill-Index-Base (SIB) byte 340, displacement bytes 350, and an intermediate data field 360. An x86 instruction may be as short as a few bytes and as long as 16 bytes. If a security module starts disassembly in the middle of x86 instruction 300 (e.g., at a displacement byte), the security module may not find a valid instruction. To determine whether a portion of code comprises a valid instruction, the security module may begin disassembly from numerous offsets as previously described.

FIG. 4 is an exemplary executable file 400 with bytes 1-32. Executable file 400 may include an instruction that starts at byte 3 and extends through byte 18. Executable file 400 may also include an instruction that begins at byte 19. A security module may choose a disassembly starting location in executable file 400. For example, the security module may begin disassembly at byte 4. Next, the security module may begin disassembly at byte 5. The security module may continue to select new starting points for disassembly until the security module reaches byte 19, where the security module will find a valid instruction. Thus, the security module may disassemble and evaluate a plurality of consecutive sections to determine whether executable file 400 comprises a valid instruction.

FIG. 5 illustrates a method for detecting an obfuscated obstacle. The method may comprise identifying an executable file programmed to execute on a target architecture (step 510). A security module may disassemble a plurality of consecutive sections of the executable file (step 520). Each section of the plurality of consecutive sections may be offset from at least one other section in the plurality of sections by at least one byte. The security module may determine whether any section in the plurality of consecutive sections comprises a valid instruction (step 530). The security module may then determine whether the executable file poses a security risk (step 540). The determination of whether the executable file poses a security risk may be based on whether one or more sections in the plurality of sections comprises a valid instruction.

Embodiments of the instant disclosure may provide numerous advantages over previous solutions. For example, some embodiments may detect an obfuscated executable file even when the executable file has low entropy. Embodiments of the instant disclosure may detect illogical, invalid, and obscure instructions in determining whether an executable file is obfuscated. Embodiments of the disclosure may also provide various other features and advantages, as described herein.

Figure 6:
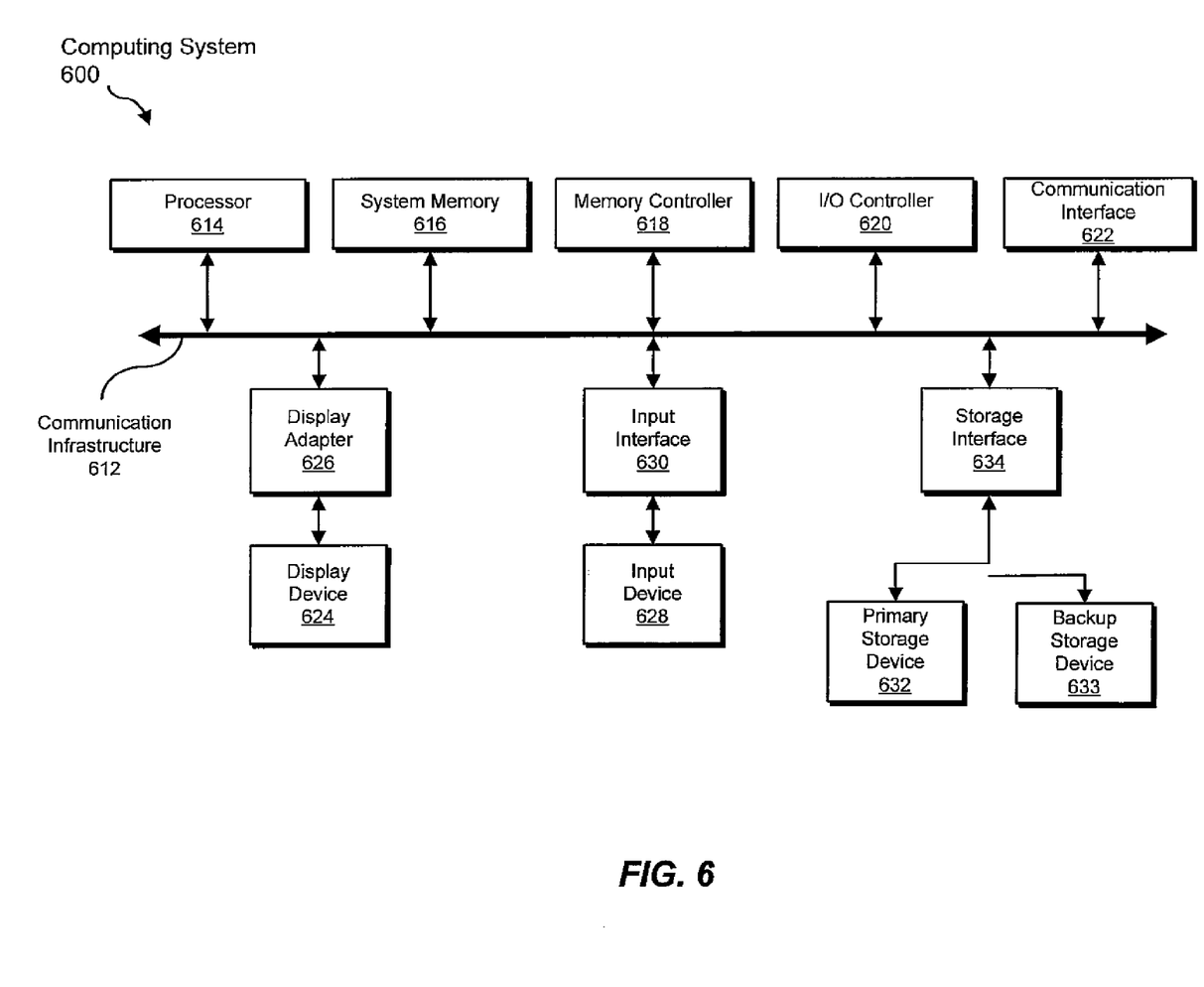
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, disassembling, determining, detecting, and/or selecting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, disassembling, determining, detecting, and/or selecting.

I/O controller 620 generally represents any type or form of module capable of coordinating and/or controlling the input and output functions of a computing device. For example, in certain embodiments I/O controller may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, disassembling, determining, detecting, and/or selecting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, disassembling, determining, detecting, and/or selecting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, disassembling, determining, detecting, and/or selecting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, disassembling, determining, detecting, and/or selecting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
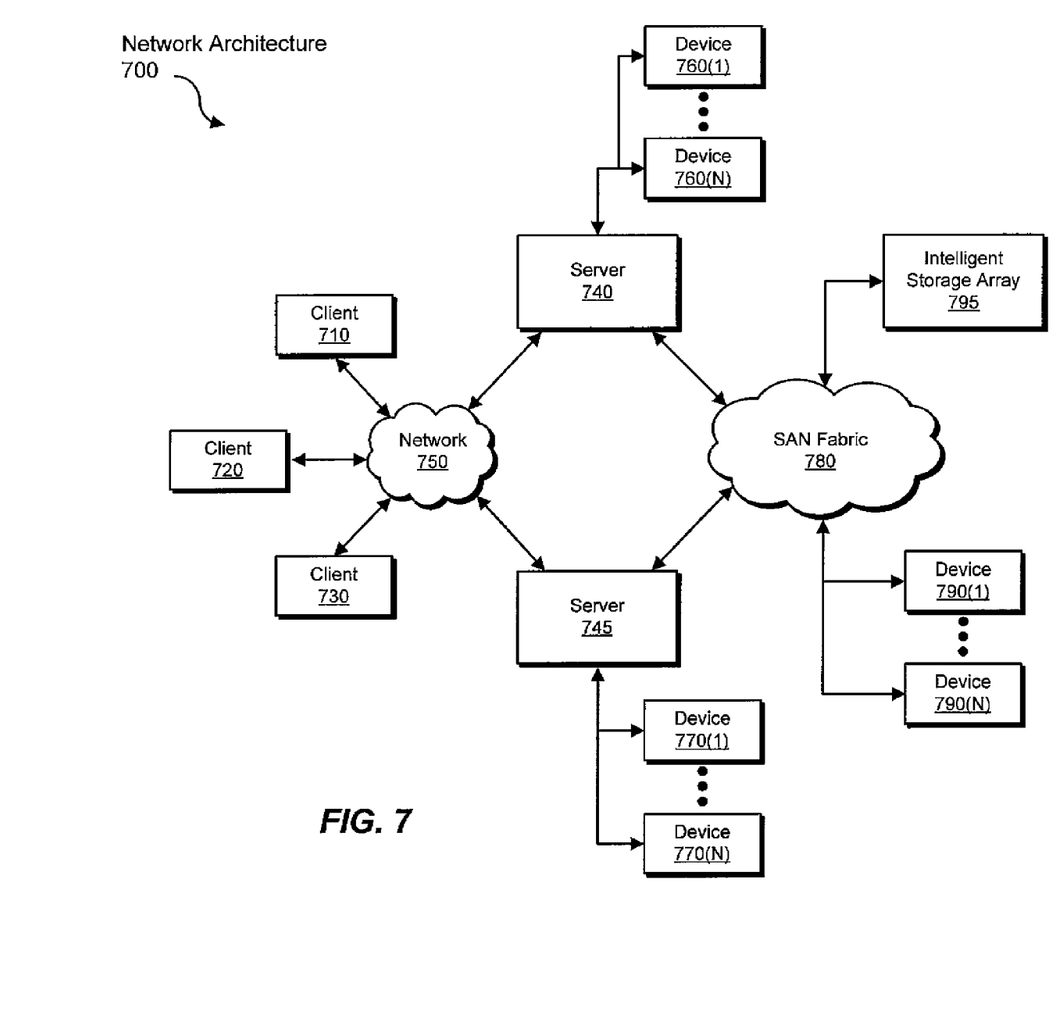
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, disassembling, determining, detecting, and/or selecting steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, a computer-implemented method for detecting an obfuscated executable may comprise identifying an executable file programmed to execute on a target architecture, disassembling a first section of the executable file, and determining whether the first section of the executable file comprises a valid instruction. The method may also comprise determining, based on whether the first section of the executable file comprises a valid instruction, whether the executable file poses a security risk.

In some embodiments, the method may comprise determining whether the first section of the executable file comprises an illogical instruction. Determining whether the executable file poses a security risk may be based on whether the first section of the executable file comprises an illogical instruction. According to various embodiments, disassembling the first section of the executable file may comprise selecting a first starting point for disassembling. The method may comprise disassembling the first section of the executable file from the first starting point.

The method may further comprise determining a second starting point for disassembling. The second starting point may be offset from the first starting point by one byte. The method may also comprise disassembling a second section of the executable file from the second starting point. In at least one embodiment, the method comprises determining whether the second section of the executable file comprises a valid instruction. Determining whether the executable file poses a security risk may be based on whether the second section of the executable file comprises a valid instruction.

According to certain embodiments, the method may comprise disassembling a plurality of sections of the executable file. The plurality of sections may comprise the first section. In some embodiments, each section in the plurality of sections may be offset from at least one other section in the plurality of sections by one byte.

According to one embodiment, a maximum-length instruction of the target architecture may comprise a number of bytes, and the number of sections in the plurality of sections may be at least equal to the number of bytes in the maximum-length instruction. In some embodiments, the plurality of instructions may comprise a plurality of consecutive instructions.

According to some embodiments, the method may comprise determining whether any section in the plurality of consecutive sections comprises a valid instruction. In such embodiments, determining whether the executable file poses a security risk may be based on whether any section in the plurality of consecutive sections comprises a valid instruction. In various embodiments, the target architecture may comprise an x86 architecture, and the maximum-length instruction of the x86 architecture comprises sixteen bytes. The method may also comprise detecting a location of the executable file within an image.

In certain embodiments, a method for detecting an obfuscated executable may comprise identifying an executable file programmed to execute on a target architecture. The method may also comprise disassembling a plurality of sections of the executable file. Each section in the plurality of sections may be offset from at least one other section in the plurality of sections by at least one byte. The method may comprise determining whether any section in the plurality of consecutive sections comprises a valid instruction. The method may comprise determining, based on whether any section in the plurality of sections comprises a valid instruction, whether the executable file poses a security risk.

In some embodiments, determining whether the executable file poses a security risk may comprise determining whether the plurality of sections comprises at least a predetermined number of valid instructions. The method may further comprise determining whether any section in the plurality of consecutive sections comprises an obscure instruction. Determining whether the executable file poses a security risk may be based on whether any section in the plurality of consecutive sections comprises an obscure instruction. In at least one embodiment, the method may comprise determining whether the plurality of consecutive sections comprises a plurality of obscure consecutive instructions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method for detecting an obfuscated executable, the computer-implemented method comprising:
   identifying an executable file programmed to execute on a target architecture;
   disassembling a first section of the executable file;
   determining that the first section of the executable file comprises an invalid instruction that cannot execute on the target architecture;
   determining, based on determining that the first section of the executable file comprises an invalid instruction, that the executable file is obfuscated;
   determining, based on determining that the executable file is obfuscated, that the executable file poses a security risk.

2. The computer-implemented method of claim 1, further comprising:
   determining that the first section of the executable file comprises an illogical instruction, wherein determining that the executable file is obfuscated is based on determining that the first section of the executable file comprises an illogical instruction.

3. The computer-implemented method of claim 1, wherein:
   disassembling the first section of the executable file comprises:
   selecting a first starting point for disassembling;
   disassembling the first section of the executable file from the first starting point.

4. The computer-implemented method of claim 3, further comprising:
   determining a second starting point for disassembling, the second starting point being offset from the first starting point by one byte;
   disassembling a second section of the executable file from the second starting point.

5. The computer-implemented method of claim 4, further comprising:
   determining that the second section of the executable file comprises an invalid instruction that cannot execute on the target architecture, wherein determining that the executable file is obfuscated is based on determining that the second section of the executable file comprises an invalid instruction.

6. The computer-implemented method of claim 3, further comprising:
   disassembling a plurality of sections of the executable file, the plurality of sections comprising the first section.

7. The computer-implemented method of claim 6, wherein:
   each section in the plurality of sections is offset from at least one other section in the plurality of sections by one byte.

8. The computer-implemented method of claim 6, wherein:
   a maximum-length instruction of the target architecture comprises a number of bytes;
   the number of sections in the plurality of sections is at least equal to the number of bytes in the maximum-length instruction.

9. The computer-implemented method of claim 1, wherein the executable file has low entropy.

10. The computer-implemented method of claim 1, wherein:
    determining that the first section of the executable file comprises an invalid instruction that cannot execute on the target architecture comprises determining that the first section of the executable file comprises a number of invalid instructions that cannot execute on the target architecture;
    determining that the executable file is obfuscated is based on determining that the number of invalid instructions exceeds a predetermined threshold.

11. The computer-implemented method of claim 1, wherein:
    determining that the first section of the executable file comprises an invalid instruction that cannot execute on the target architecture comprises determining that the first section of the executable file comprises an instruction that is missing at least one component necessary to execute on the target architecture;
    the target architecture comprises an x86 architecture;
    a maximum-length instruction of the x86 architecture comprises sixteen bytes.

12. The computer-implemented method of claim 1, wherein:
    determining that the first section of the executable file comprises an invalid instruction that cannot execute on the target architecture comprises:

determining that the first section of the executable file comprises a number of invalid instructions that cannot execute on the target architecture;

computing, based on the number of invalid instructions, a ratio of invalid instructions to a total number of instructions within the first section;

determining that the executable file is obfuscated is based on determining that the ratio of invalid instructions is above a predetermined ratio.

13. A computer-readable storage medium comprising one or more computer-executable instructions that, when executed by a computing device, cause the computing device to:

identify an executable file programmed to execute on a target architecture;

disassemble a first section of the executable file;

determine that the first section of the executable file comprises an invalid instruction that cannot execute on the target architecture;

determine, based on the first section of the executable file comprising an invalid instruction, that the executable file is obfuscated;

determine, based on determining that the executable file is obfuscated, that the executable file poses a security risk.

14. The computer-readable storage medium of claim 13, wherein the one or more computer-executable instructions, when executed by the computing device, further cause the computing device to:

select a first starting point for disassembling;

disassemble the first section of the executable file from the first starting point.

15. The computer-readable storage medium of claim 14, wherein the one or more computer-executable instructions, when executed by the computing device, further cause the computing device to:

disassemble a plurality of consecutive sections of the executable file, wherein:

the plurality of consecutive sections comprises the first section;

each section in the plurality of consecutive sections is offset from at least one other section in the plurality of consecutive sections by one byte;

determine that any section in the plurality of consecutive sections comprises an invalid instruction that cannot execute on the target architecture;

determine that the executable file is obfuscated based on any section in the plurality of consecutive sections comprising an invalid instruction.

16. The computer-readable storage medium of claim 13, wherein the one or more computer-executable instructions, when executed by the computing device, further cause the computing device to:

determine that the first section of the executable file comprises an illogical instruction;

determine, based on the first section of the executable file comprising an illogical instruction, that the executable file is obfuscated.

17. A computer-implemented method for detecting an obfuscated executable, the computer-implemented method comprising:

identifying an executable file programmed to execute on a target architecture;

disassembling a plurality of sections of the executable file, wherein each section in the plurality of sections is offset from at least one other section in the plurality of sections by at least one byte;

determining that any section in the plurality of sections comprises an invalid instruction that cannot execute on the target architecture;

determining, based on any section in the plurality of sections comprising an invalid instruction, that the executable file is obfuscated;

determining, based on determining that the executable file is obfuscated, that the executable file poses a security risk.

18. The computer-implemented method of claim 17, wherein:

determining that the executable file is obfuscated comprises determining that the plurality of sections comprises at least a predetermined number of invalid instructions.

19. The computer-implemented method of claim 17, further comprising:

determining that any section in the plurality of sections comprises an obscure instruction, wherein determining that the executable file is obfuscated is based on whether any section in the plurality of sections comprises an obscure instruction.

20. The computer-implemented method of claim 19, further comprising:

determining that the plurality of sections comprises a plurality of obscure instructions.

* * * * *